US012745060B2

(12) United States Patent
Ranjan et al.

(10) Patent No.: US 12,745,060 B2
(45) Date of Patent: Sep. 22, 2026

(54) SYSTEM AND METHOD FOR HOSPITALITY PRESENCE DETECTION AND REPORTING OF SAME IN ELECTRONIC COMMUNICATIONS

(71) Applicant: Mitel Networks Corporation, Kanata (CA)

(72) Inventors: Alok Ranjan, Bangalore (IN); Logendra Naidoo, Ottawa (CA)

(73) Assignee: MITEL NETWORKS CORPORATION, Kanata (CA)

( * ) Notice: Subject to any disclaimer, the term of this patent is extended or adjusted under 35 U.S.C. 154(b) by 482 days.

(21) Appl. No.: 18/239,655

(22) Filed: Aug. 29, 2023

(65) Prior Publication Data

US 2025/0080947 A1 Mar. 6, 2025

(51) Int. Cl.
*H04W 4/029* (2018.01)
*H04W 4/33* (2018.01)

(52) U.S. Cl.
CPC ............. *H04W 4/029* (2018.02); *H04W 4/33* (2018.02)

(58) Field of Classification Search
CPC ....... H04W 4/029; H04W 4/33; H04W 4/021; H04M 3/42314; H04M 3/42348
USPC ...... 455/456.1, 422, 440; 340/988, 996, 340
See application file for complete search history.

(56) References Cited

U.S. PATENT DOCUMENTS 7,519,052 B2 * 4/2009 Aoki ....................... H04L 67/52 455/456.2
8,543,999 B2 * 9/2013 DelloStritto .......... G06F 13/387 717/176
9,402,163 B2 * 7/2016 Edge ..................... H04W 12/10
9,578,115 B2 * 2/2017 Edge ..................... H04W 4/029
10,009,868 B1 6/2018 Reyes et al.
2008/0233969 A1 * 9/2008 Mergen ................... H04W 4/16 455/456.1
2012/0009904 A1 * 1/2012 Modi .................... H04W 4/029 455/456.1
2013/0217332 A1 8/2013 Altman et al.

(Continued)

FOREIGN PATENT DOCUMENTS

WO 2019193606 A1 10/2019

OTHER PUBLICATIONS

European search opinion dated Jan. 30, 2025 for EP24196896 (Year: 2025).*

(Continued)

*Primary Examiner* — Juan A Torres

(57) ABSTRACT

Systems and methods for detecting a presence of a tracked device (e.g., a device of a guest, an employee, and/or a device coupled to an object), identifying the tracked device (e.g., as being associated with the guest, the employee, and/or the object), and determining a location of the tracked device (e.g., within a venue) can include a plurality of devices and one or more servers. The systems a plurality of communication modules configured to form a network of physical reference points in at least a portion of a venue. The plurality of communication modules can communicate with one or more servers, and the one or more servers can identify and determine a location of the tracked device based on data received in response to presence data being detected. The one or more servers and/or each device can perform various methods associated with presence detection, identification, and location determination.

19 Claims, 10 Drawing Sheets

(56) References Cited

U.S. PATENT DOCUMENTS

| | | | | |
|---|---|---|---|---|
| 2014/0162693 | A1* | 6/2014 | Wachter | H04W 4/021 455/456.3 |
| 2014/0315580 | A1* | 10/2014 | Gupta | H04W 4/33 455/456.2 |
| 2016/0143065 | A1* | 5/2016 | Gupta | H04W 4/023 455/404.2 |
| 2016/0217397 | A1* | 7/2016 | Peters | G06Q 10/02 |
| 2016/0262126 | A1* | 9/2016 | Hillier | G01S 5/0295 |
| 2019/0380007 | A1* | 12/2019 | Mahmoud | H04W 4/80 |
| 2020/0236492 | A1* | 7/2020 | Lévêque | G08B 25/10 |
| 2021/0127228 | A1 | 4/2021 | Baarman et al. | |
| 2023/0016774 | A1* | 1/2023 | Link, II | G01S 11/06 |
| 2024/0373192 | A1* | 11/2024 | Cattermole | H04W 4/029 |

OTHER PUBLICATIONS

Paras Gugliani, "Who are the players in Beacon technology for home automation?", Sep. 5, 2016, Linkedin.com.
Ioannis Agadakos et al., "Location-enhanced Authentication using the IoT", ASCAC '16, Dec. 5-9, 2016, Los Angeles, CA USA.
Crestron, "Creston Mercury—Tabletop UC Audio Conference System", 2018, Cresteon.com.

* cited by examiner

302

Display Device
140

User Interface
142

Server(s)
130

311

313

Device
112

Communication Module
122

Device
112

Communication Module
122

331

333

Tracked Device
150

Processor
152

Memory
154

Transceiver
156

SYSTEM AND METHOD FOR HOSPITALITY PRESENCE DETECTION AND REPORTING OF SAME IN ELECTRONIC COMMUNICATIONS

FIELD

The present disclosure generally relates to systems and methods for presence detection, and more particularly to systems and methods for presence detection and reporting in a communications network for hospitality management.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may be inventions.

Hospitality management is a broad field that involves overseeing the day-to-day administrative, operational, and commercial activities of hospitality businesses. The hospitality industry, and more particularly hospitality management, is implementing Internet of Things ("IoT") centric systems to better serve customers and to increase efficiency of operations. For example, the hotel industry can use IoT to provide integrated services, such as application-driven devices and automated triggers, like automated door locks, set-top-boxes, thermostats, telephones, light switches, electric blinds, and other devices that are connected on a common network to enable the services that guests want. Implementation of IoT solutions for the hospitality industry can also enable proprietors to optimize the front desk, concierge, room service, and employees to address customer requirements through data-driven triggers and alerts.

Accordingly, in the hospitality industry and/or in hospitality management, it may be desirable to detect a guest presence, identify the guest, and determine a precise location of the guest a location of each guest and employee on the premises to better facilitate guest management and guest services.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
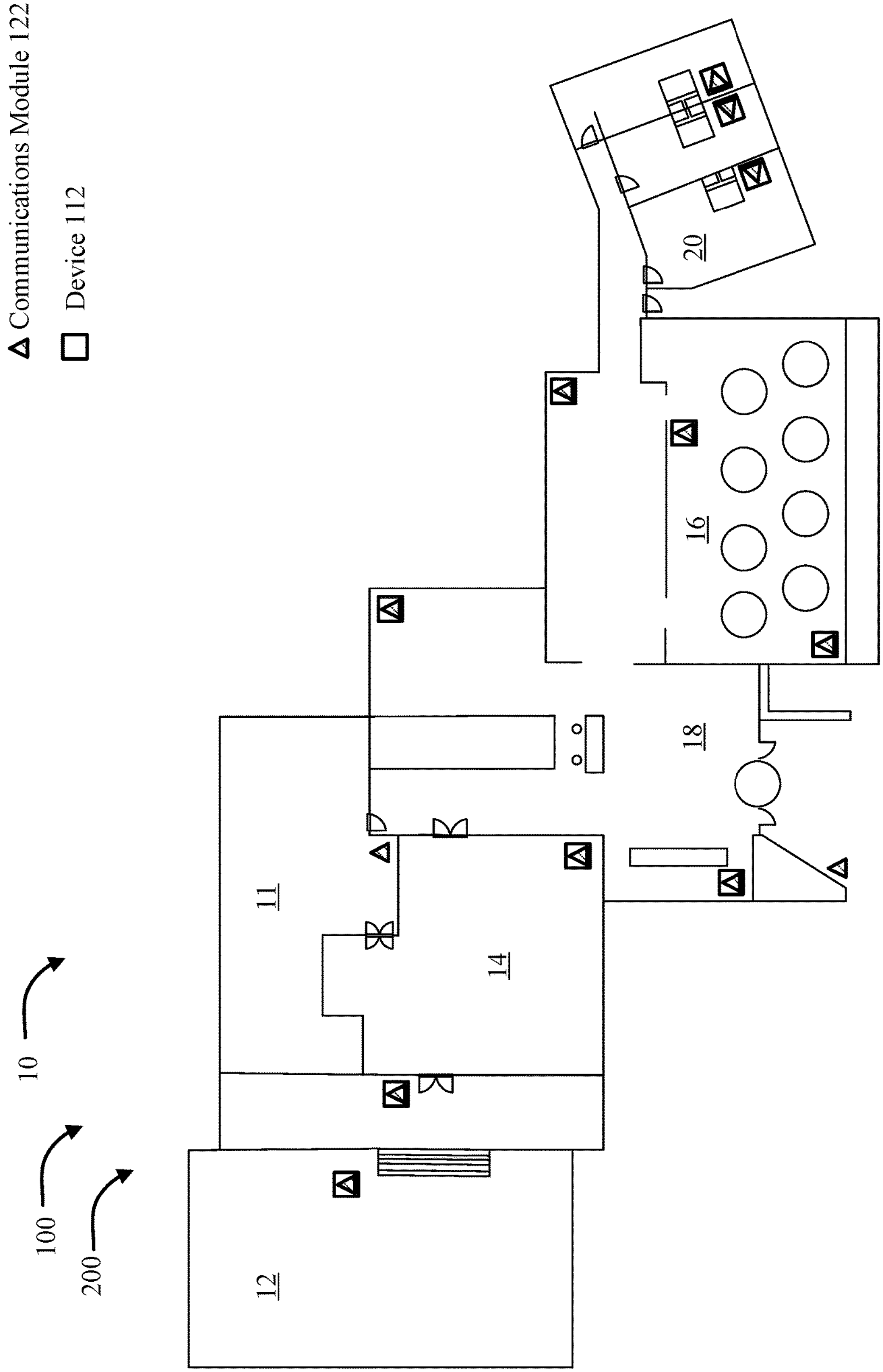
FIG. 1A illustrates a layout of a venue with an indoor positioning system, in accordance with various embodiments.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

Disclosed herein are systems and methods for hospitality management and/or events management. For example, disclosed herein are systems and methods for detecting a user (e.g., a guest, an employee, an attendee at a conference, or the like) presence, identifying the user, and/or determining a precise location of the user. Although described herein as systems and methods for detecting a guest presence, identifying the guest presence, and determining a precise location of the guest, the present disclosure is not limited to utilizing these systems and methods in combination. In particular, systems and methods for detecting guests only may be desirable (e.g., to determine whether a conference room is at or near capacity, determining a precise head count in an area, or the like). Similarly, systems and methods for guest detection and identification without localization may be desirable (e.g., for determining entrance to a pay-to-enter area of a hotel or resort). Accordingly, various combinations of detecting, identifying, and/or determining guest (or employee) locations are within the scope of this disclosure.

Disclosed herein are systems and methods for capturing real-time data in a hospitality (or events) venue (e.g., a hotel, a resort, a casino, or the like) related to the presence of a guest (or employee) within the premises of the hospitality venue. In various embodiments, the system can be integrated (e.g., retrofitted) into an existing hospitality venue as described further herein. For example, by installing a communications module in accordance with this disclosure into each phone in a private branch exchange phone system, a system for guest (or employee) presence detection, identification, and localization can be formed as described further herein. Although described herein as being retrofittable into an existing system, the present disclosure is not limited in this regard. For example, the communication modules disclosed herein can be originally manufactured within a phone in the private branch exchange phone system, the communication modules can be installed independently of a phone in a private branch exchange phone system (e.g., in another device or by itself) and still be within the scope of this disclosure.

Disclosed herein is a method for detecting guest (or an employee) presence, identifying the guest (or employee) and/or locating the guest (or employee). The method can be an integration of Internet of Things ("IoT") objects and artificial ("AI") capabilities with private branch exchange ("PBX") Phone systems. The method can provide a seamless fusion of IoT and A.I. functionalities. The method disclosed herein goes beyond mere beacon-detection by harnessing the power of IoT devices to detect, identify, and precisely detect and/or localize the presence of guests (or employees), thereby providing an advanced level of guest management and experience that surpasses existing solutions in the hospitality industry.

In various embodiments, by implementing IoT-centric systems, customers (e.g., guests) of hospitality venues, can be served better and to increase the efficiency of its operations. For example, the venue can use IoT to provide integrated services such as application-driven devices and automated triggers like automated door locks, set-top-boxes, thermostats, telephones, light switches, electric blinds, and other devices that are connected on a common network to enable the services that guests want. There exists many such IoT solutions to leverage hospitality management.

Implementation of IoT solutions, as described further herein, for the hospitality industry enables a proprietor to optimize the front desk, concierge, room service, and employees to address customer requirements through data-driven triggers and alerts. In various embodiments, by automating various IoT devices within a venue with guest, employee, and/or object data to get the locale information for the guest, employee, and/or object, the systems and methods disclosed herein can provide a better experience and gain more customer loyalty.

Disclosed herein are systems and methods provides a way to capture the real-time data related to the presence of a guest, an employee, and/or an object within venue, without an additional burden of installing extra device, in accordance with various embodiments. As described further herein, the systems and methods disclosed herein can seamlessly merge the functionalities of traditional PBX Phone systems with a diverse range of IoT devices, enabling the detection, identification, and precise localization of guests within a hospitality venue. By combining these prevalent internet technologies, the exemplary systems and methods disclosed herein create a cohesive and efficient system that sets new standards for guest management in the industry. For example, the systems disclosed herein can include phones at a hospitality venue that are equipped with wireless (e.g., near-field communication, Bluetooth®, Bluetooth low energy (BLE), or the like) capability that rely on proximity detection to locate tracked devices (e.g., guest smartphones, employee smartphones, tracking tags of objects, or the like) and automatically generate messages, actions, or the like to guests or employees or automatically execute actions, such as billing or the like.

In various embodiments, the systems and methods disclosed herein can be configured to automatically detect the presence of a user (e.g., a guest, an attendee, an employee, or the like). In various embodiments, in response to a system receiving a data input for an identifier of an object, the system can automatically generate a last known location of the object. Similarly, in various embodiments, in response to the system receiving a data input for an identifier of a user (e.g., guest, an attendee, or an employee), the system can automatically generate a last known location of the user. In various embodiments, the system can facilitate users identification and localization of objects (e.g., baggage, purses, briefcases, etc.) by automatically generating messages to guests (e.g., through a user interface of a user device) in response to a user inputting an identifier for the object. In various embodiments, the system disclosed herein can automatically generate messages to users (e.g., guests or attendees), such as advertisements, special promotional offers or the like, in response to a user being within a certain proximity of a communications module as described further herein. In various embodiments, the system and methods disclosed herein can facilitate an automatic message relay. For example, a message can automatically be generated to a user through a user interface on the users device in response to a data input being generated (e.g., from an employee, a parent of a guest, or the like).

The systems and methods disclosed herein can provide an IoT-based presence integration system capable of effectively managing guests, while also providing scalable services that utilize guest's precise presence information for hospitality-centric billing. Accordingly, these systems and methods can offer a unique solution that addresses the existing limitations in the field of guest management within the hospitality industry.

Although described herein with regard to the hospitality industry and use in a hospitality venue, the present disclosure is not limited in this regard. For example, the systems and methods disclose herein can further be configured for indoor navigation, an office venue, a hospital venue, or the like. With regard to indoor navigation and, although geographical positioning systems ("GPS") typically work well, GPS can have issues with providing accurate navigation indoors. Accordingly, IoT enabled phones (e.g., with communication modules disclosed herein, can create an indoor network which can be utilized for indoor navigation. With regard to office venues, exemplary methods disclosed herein can generate information to an office room, such as whether the room is occupied or available, or used to display whether the room is at or approaching capacity. With regard to hospital venues, the systems disclosed herein can facilitate identification and localization of a doctor to determine doctor availability or the like, in accordance with various embodiments.

Figure 1B:
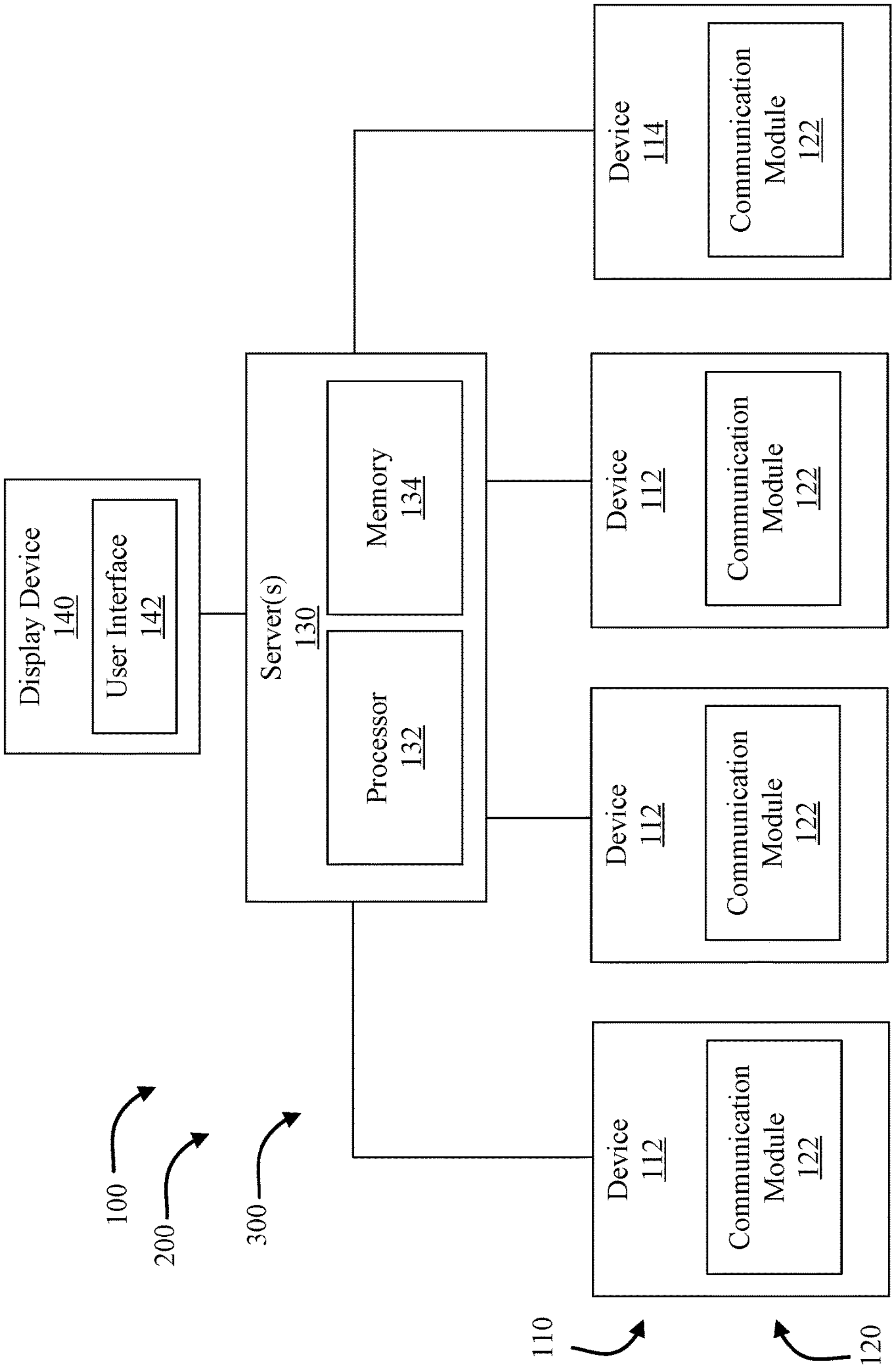
FIG. 1B illustrates a schematic view of an indoor positioning system, in accordance with various embodiments.

Referring now to FIGS. 1A and 1B, a layout view of a venue 10 having an indoor positioning system 100 (FIG. 1A) and a schematic view of the indoor positioning system 100 (FIG. 1B) are illustrated, in accordance with various embodiments. In various embodiments, the venue 10 can include a hospitality venue (e.g., a hotel, a resort, a casino, or the like), an office venue (e.g., an office building, an office space, or the like), a hospital venue (e.g., a hospital building, a care center, or the like), or another venue where detection of presence, identification, and localization of users is desired. The present disclosure is not limited in this regard.

In various embodiments, the indoor positioning system 100 is configured to locate people (or objects) where GPS or other satellite technologies lack precision. In particular, the indoor positioning system 100 is configured to detect a presence of an individual (e.g., a guest, an employee, or the like), identify the individual, and/or determine a location of the individual as described further herein. In various embodiments, the indoor positioning system 100 can be configured to generate personalized recommendations to a guest based on a location of the respective guest. In various embodiments, the indoor positioning system 100 can continuously monitor guest movements in case the guest needs to be located for any particular reason (e.g., emergency, family member looking for them, etc.). In various embodiments, the indoor positioning system 100 can be configured to capture important events (e.g., entering a pay only area, such as a restaurant, spa, parking, boardroom, or the like). In various embodiments, in response to capturing a guest entering a pay only area, a charge to a room of a guest may be generated (e.g., automatically), a table in a restaurant can be determined (e.g., to correlate a bill after a guest leaves), an amount of time in parking can be determined, etc. The present disclosure is not limited in this regard. One skilled in the art may recognize various capabilities for the indoor positioning system 100 and use of the indoor positioning system 100 with various payment activities within a venue 10 and still be within the scope of this disclosure.

In various embodiments, the indoor positioning system 100 can be a component of a hospitality management system 200. In this regard, the hospitality management system 200 can utilize information gathered from the indoor positioning system 100 to generate sales metrics (e.g., graphs, tables, or the like) on guest behavior and engagement levels for business analysis (e.g., approaches a payment area but leaves area as opposed to entering). In various embodiments, stored data from the indoor positioning system 100 can be integrated with hospitality management system 200. For example, guest activities can be tracked by the indoor positioning system and used by the hospitality management system 200 for accurate billing, in accordance with various embodiments. In various embodiments, by integrating the captured events from the indoor positioning system 100 with a billing server of the hospitality management system 200, a hospitality provider can accurately track and charge guests for their use of commerce applications and services within the venue 10. This can allow for seamless billing based on guest activities and enable the venue 10 (e.g., a hospitality provider) to ensure accurate and efficient payment processes, in accordance with various embodiments.

In various embodiments, the indoor positioning system 100 comprises a plurality of communication modules 120. The plurality of communication modules 120 are configured to form a network of physical reference points in at least a portion of the venue 10. For example, at least one communication module in the plurality of communication modules 120 can be disposed in each area of the venue 10 (e.g., a spa 12, a restaurant 14, a conference room 16, a reception area 18, a bedroom 20, or the like). Although described as having at least one communication module in each area of the venue 10, the present disclosure is not limited in this regard. For example, one communication module in the plurality of communication modules 120 can cover multiple areas of the venue 10 (e.g., reception area 18 and restaurant 14) and still be within the scope of this disclosure.

In various embodiments, the indoor positioning system 100 further comprises a plurality of devices 110. The plurality of devices 110 includes a device 112. In various embodiments, each device in the plurality of devices 110 can be in accordance with the device 112. However, the present disclosure is not limited in this regard. For example, different devices (e.g., the device 112 can be a phone and a device 114 can be a router) included in the plurality of devices 110 and configured to house a communication module, and still be within the scope of this disclosure.

In various embodiments, each communications module in the plurality of communication modules 120 is coupled to a respective device in the plurality of devices 110. Although described herein as being a component of a device in the plurality of devices 110, the communication modules 120 of the present disclosure are not limited in this regard. For example, a communication module in the plurality of communication modules 120 can be installed anywhere in the venue 10 independent of a respective device in the plurality of devices 110 (e.g., near a router or a server, in a wall, a plant, or the like). The present disclosure is not limited in this regard. In various embodiments, with brief reference to FIGS. 2A-C, the plurality of communication modules 120 includes a communications module 122 (e.g., communications module 201 from FIG. 2A, communications module 202 from FIG. 2B, or communications module 203 from FIG. 2C). In various embodiments, each and every communication module in the plurality of communication modules 120 can comprise a single type of communication module (e.g., all communication modules in the plurality of communication modules 120 can be the communications module 201 from FIG. 2A). In various embodiments, the plurality of communication modules 120 can comprise more than one of the types of communication modules (e.g., communications module 201, communications module 202, and/or communications module 203). The present disclosure is not limited in this regard.

In various embodiments, each communications module in the plurality of communication modules 120 includes one of a receiver and a transmitter as described further herein. In this regard, each communication module in the plurality of communication modules 120 can be configured to receive data (e.g., from a guest or employee device) and/or configured to transmit data (e.g., to a guest or employee device) to facilitate detecting, identifying, and locating of the respective guest or employee, in accordance with various embodiments.

In various embodiments, the indoor positioning system 100 further comprises one or more servers 130. The one or more servers 130 may be integrated into a computer system of the hospitality management system 200 (e.g., in processor 132 and/or memory 134). In various embodiments, the one or more servers 130 may be configured as a central network element or hub to various systems and components of the indoor positioning system 100. In various embodiments, each server in the one or more servers 130 may comprise a processor (e.g., processor 132). In various embodiments, one or more servers 130 may be implemented as a single server (e.g., via a single processor 132 and associated memory 134). In various embodiments, one or more servers 130 may be implemented as multiple servers (e.g., a main processor and local processors for various components, or a decentralized network of main processors). The one or more servers 130 can include a general-purpose processor, a digital signal processor (DSP), an application specific integrated circuit (ASIC), a field programmable gate array (FPGA) or other programmable logic device, discrete gate or transistor logic, discrete hardware components, or any combination thereof. Each server in the one or more servers 130 may comprise processor 132 configured to implement various logical operations in response to execution of instructions, for example, instructions stored on a non-transitory, tangible, computer-readable medium (e.g., memory 134) configured to communicate with the one or more servers 130. In various embodiments, the one or more servers 130 are servers of a cloud-based system.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

The one or more servers 130 are in electronic communication with the plurality of devices (e.g., wired or wireless). In various embodiments, the one or more servers 130 are configured to track a location of a tracked device relative to the network of physical reference points based on data received in response to a wireless connection between a tracked device and at least one communication module in the plurality of communication modules 120 as described further herein. By tracking a tracked device, a location of a user that owns the tracked device can coincidently be tracked. Stated another way, a user location and a tracked device location can be synonymous for purposes of this disclosure, in accordance with various embodiments.

In various embodiments, the indoor positioning system 100, further comprises, or is a component of, a private branch exchange phone system 300. In this regard, each device in the plurality of devices 110 can comprise a phone in the private branch exchange phone system 300, and a server in the one or more servers 130 can be a private branch exchange server in the private branch exchange phone system 300. In various embodiments, the indoor positioning system 100 can seamlessly merge functionalities of a traditional private branch exchange phone system with a diverse range of IoT devices, enabling the detection, identification, and precise localization of guests and/or employees with the venue 10, in accordance with various embodiments. In various embodiments, by utilizing private branch exchange phones as each device in the plurality of devices 110 the plurality of communication modules 120 can be retrofitted into existing infrastructure and operably be coupled to the one or more servers 130 of the private branch exchange phone system 300. In this regard, the private branch exchange phone system 300 can be utilized by the indoor positioning system 100 to receive and process information from an array of IoT devices deployed within its range for detecting, identifying, and locating guests, employees, or objects, in accordance with various embodiments.

Figure 2A:
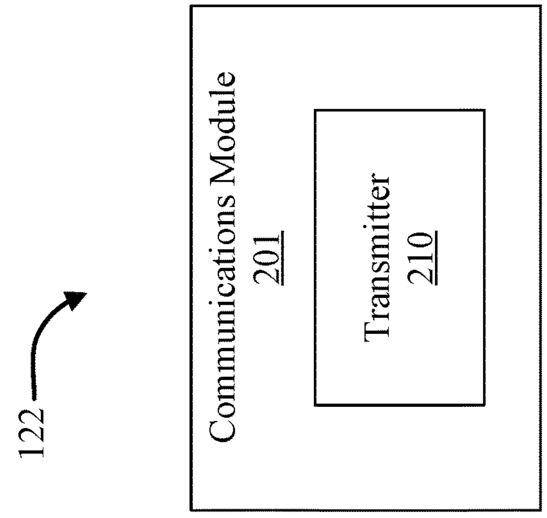
FIG. 2A illustrates a device for use in an indoor positioning system, in accordance with various embodiments.
Figure 2B:
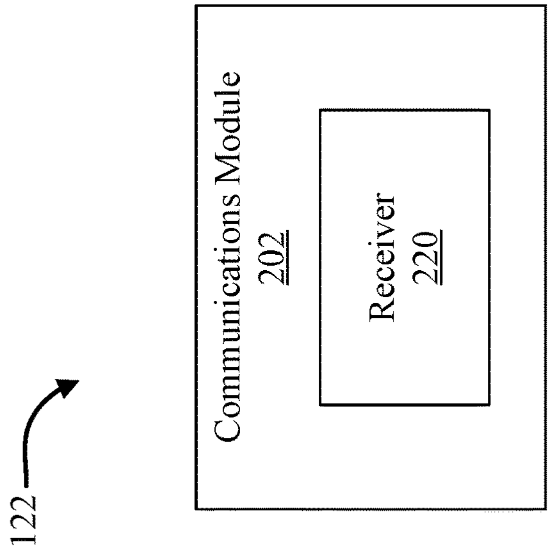
FIG. 2B illustrates a device for use in an indoor positioning system, in accordance with various embodiments.
Figure 2C:
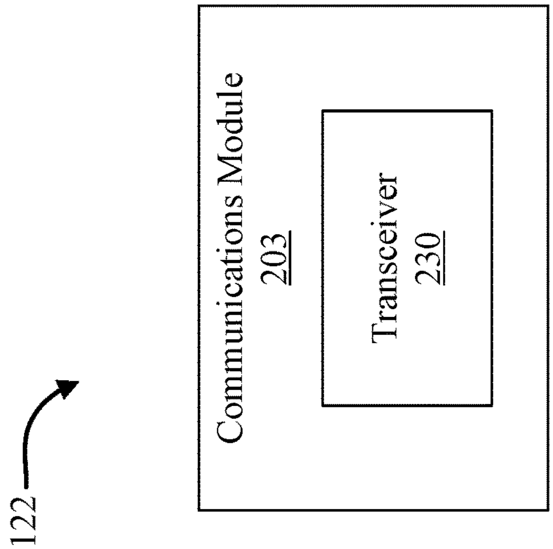
FIG. 2C illustrates a device for use in an indoor positioning system, in accordance with various embodiments.

With brief reference now to FIGS. 2A-C, in various embodiments, each communications module in the plurality of communication modules 120 comprises a transmitter 210 (e.g., a Bluetooth® Low Energy ("BLE") beacon, or any other radio wave transmitter), a receiver 220 (e.g., a near field communication ("NFC") receiver or the like), or a transceiver 230 (e.g., configured for radio wave transmission/reception or NFC transmission/reception).

In various embodiments, the transmitter 210 from FIG. 2A or within the transceiver 230 of FIG. 2C, is configured to periodically transmit data packets (e.g., BLE data packets) including a unique location identifier associated with a physical reference point in the network of physical reference points (e.g., a physical reference point defined by the physical location of the device in the plurality of devices 110 the communications module 122 is installed therein.

With reference now to FIGS. 1B, 2A and 2C, the communications module 122 can be configured to transmit data packets (e.g., from the transmitter 210 or the transceiver 230 and via Bluetooth®, BLE, or the like). In this regard, in response to a tracked device 150 detecting the data packets (e.g., by a receiver or transceiver disposed in the tracked device 150), a wireless connection between the tracked device 150 and the communications module 122 is formed. Based on the wireless connection, data from the communications module 122 can be transmitted to the tracked device 150 (e.g., a unique location identifier of the communications module 122 corresponding to a physical reference point within the venue 10 from FIG. 1A and/or instructions to a processor of the tracked device 150 to transmit presence data to the one or more servers 130). In this regard, in response to forming the wireless connection, the tracked device 150 can receive data from the communications module 122 (e.g., the unique location identifier and instructions) and transmit presence data including at least a portion of the data received from the communications module 122 and data from the tracked device 150 (e.g., a signal strength between the communications module 122 and the tracked device, 150, an identifier associated with the tracked device 150, or the like) to the one or more servers 130 (e.g., wirelessly). Accordingly, the one or more servers can receive the presence data from the tracked device 150, and the one or more servers 130 can automatically perform various processes as described further herein.

With reference now to FIGS. 1B, 2B, and 2C, the communications module 122 can be configured to receive data from a tracked device (e.g., by the receiver 220 or the transceiver 230 via near-field communication or the like). In this regard, in response to the communications module 122 receiving at least a portion of presence data (e.g., an identifier associated with the tracked device 150) from the tracked device 150, a processor of the communications module 122 (or a processor of the corresponding device 112) can transmit the presence data with additional presence data determined from the communications module 122 (e.g., a signal strength between the tracked device 150 and the communications module 122, a unique location identifier associated with the communications module 122 or the device 112, or the like) to the one or more servers 130 (e.g., through a wired or wireless connection), in accordance with various embodiments. Accordingly, the one or more servers 130 can receive the presence data from the communications module 122 (or the device 112), and the one or more servers 130 can automatically perform various processes as described further herein.

Figure 3A:
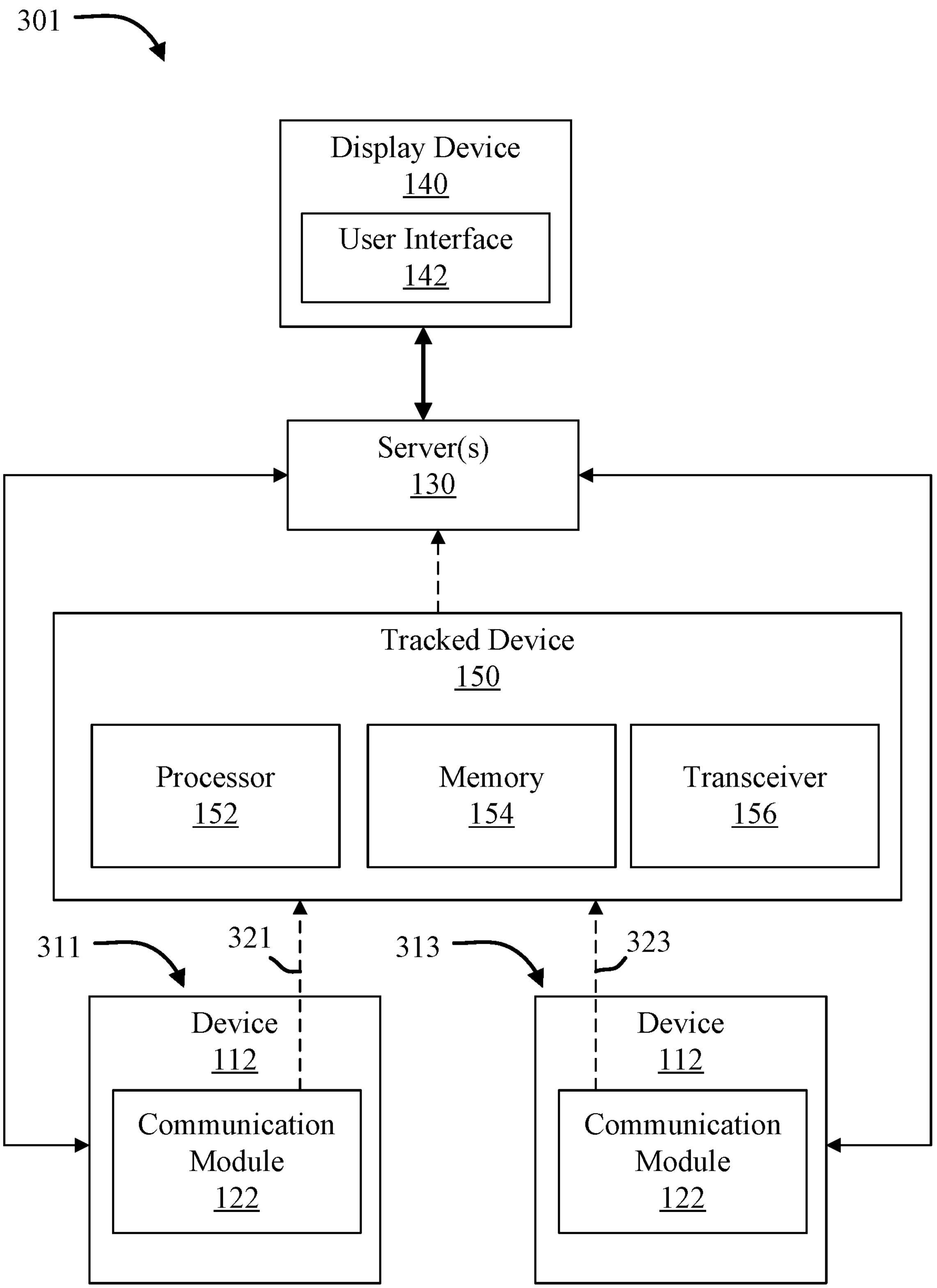
FIG. 3A illustrates a schematic view of an indoor positioning system, in accordance with various embodiments.

Referring now to FIG. 3A, an indoor positioning system 301 having a communications module 122 in accordance with one of FIG. 2A or FIG. 2C (i.e., including a transmitter 210 or a transceiver 230) is illustrated, in accordance with various embodiments. In various embodiments, the communications module 122 for each device in the plurality of devices 110 is configured to periodically transmit data packets (e.g., BLE packets or any other radio wave data packets). In this regard, a tracked device 150 (e.g., a phone, a watch, or the like) with a processor 152, a memory 154, and a transceiver 156 can detect the data packets transmitted from the communications module 122 and transmit data to the one or more servers 130. In this regard, the one or more servers 130 of the indoor positioning system 301 can be configured to receive, from the tracked device 150, presence data. For example, the presence data can include an identifier associated with the tracked device 150, a radio signal strength of a radio signal transmitting the data from the tracked device 150, and/or a unique location identifier associated with a physical reference point of the device 112 and in the network of physical reference points described previously herein. In this regard, the data packets transmitted from the communications module 122 can be relayed from the tracked device 150 to the one or more servers 130 via wireless communication (e.g., via Bluetooth®, a network, or the like). Based on the data received from the tracked device 150, the one or more servers 130 can determine a presence of a user (or object) associated with the tracked device 150, identify the user (or object) associated with the tracked device 150, and determine an estimated location of the user (or object) associated with the tracked device 150, in accordance with various embodiments.

Figure 3B:
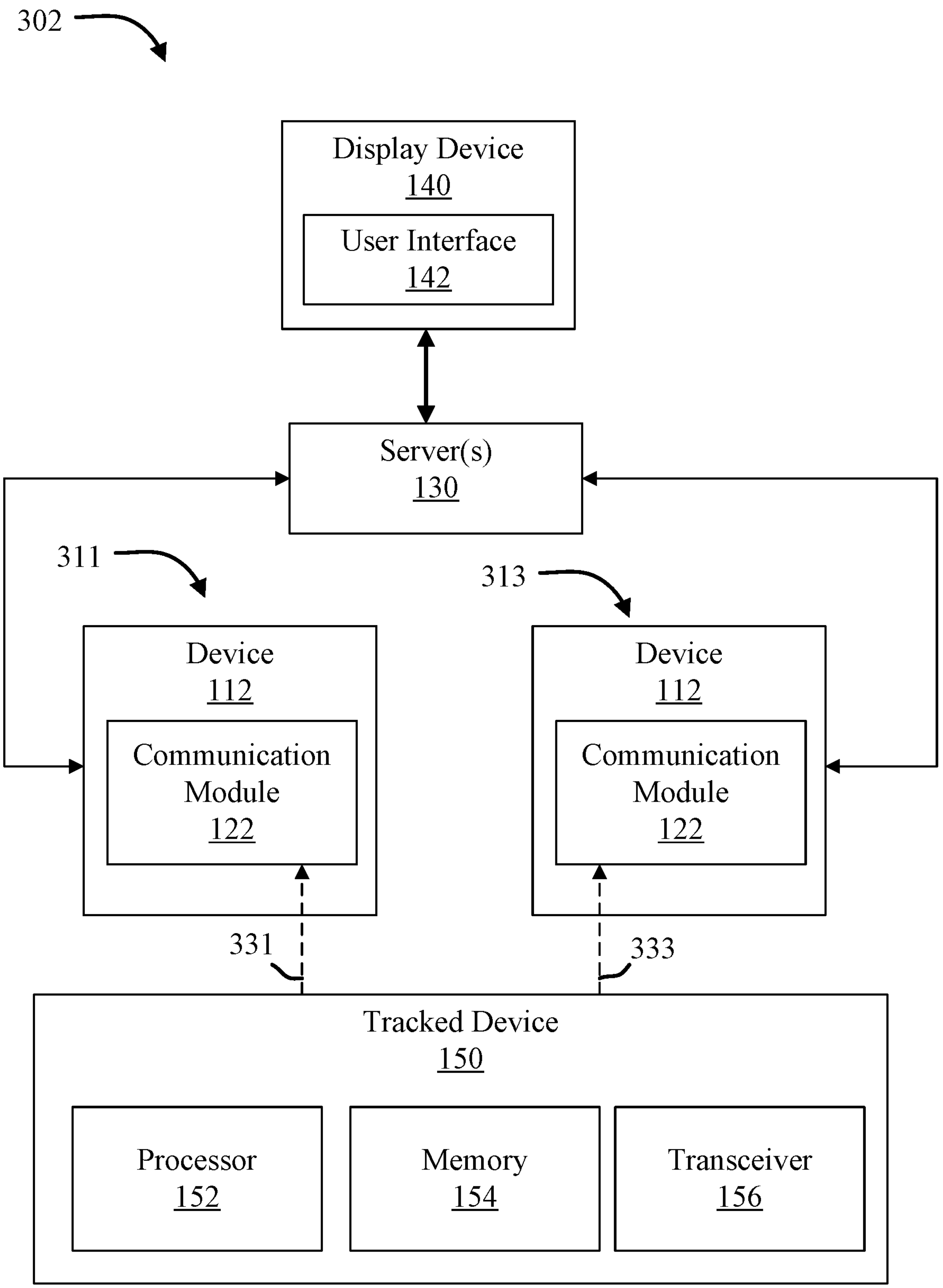
FIG. 3B illustrates a schematic view of an indoor positioning system, in accordance with various embodiments.

Referring now to FIG. 3B, an indoor positioning system 302 having a communications module 122 in accordance with FIG. 2B or FIG. 2C (i.e., including a receiver 220 or a transceiver 230) is illustrated in accordance with various embodiments. In various embodiments, the receiver 220 or the transceiver 230 can be configured for near-field communication (i.e., short-range wireless connectivity). In this regard, the communications module 122 can be configured to receive from a tracked device 150 (e.g., a phone, a watch, or the like) with a processor 152, a memory 154, and a transceiver 156, a radio signal from the tracked device 150. In this regard, the device 112 (or a set of devices from the plurality of device 112) can relay data received from the radio signal to the one or more servers 130. For example, the received data from the radio signal of the tracked device 150 can include an identifier associated with the tracked device 150, as described further herein, a signal strength of the radio signal or the like. In various embodiments, the device 112 can further be configured to transmit, with the received data from the tracked device 150, a unique location identifier associated with a physical reference point of the device 112 and in the network of physical reference points described previously herein. In this regard, the one or more servers 130 can receive data corresponding to a physical location of the device 112, a unique identifier associated with the tracked device 150, and/or a signal strength of the radio signal received from the tracked device 150, in accordance with various embodiments. Based on the data received from the device 112 (or a set of devices in the plurality of devices 110), the one or more servers 130 can determine a presence of a user (or object) associated with the tracked device 150, identify the user (or object) associated with the tracked device 150, and determine an estimated location of the user (or object), in accordance with various embodiments.

Figure 4:
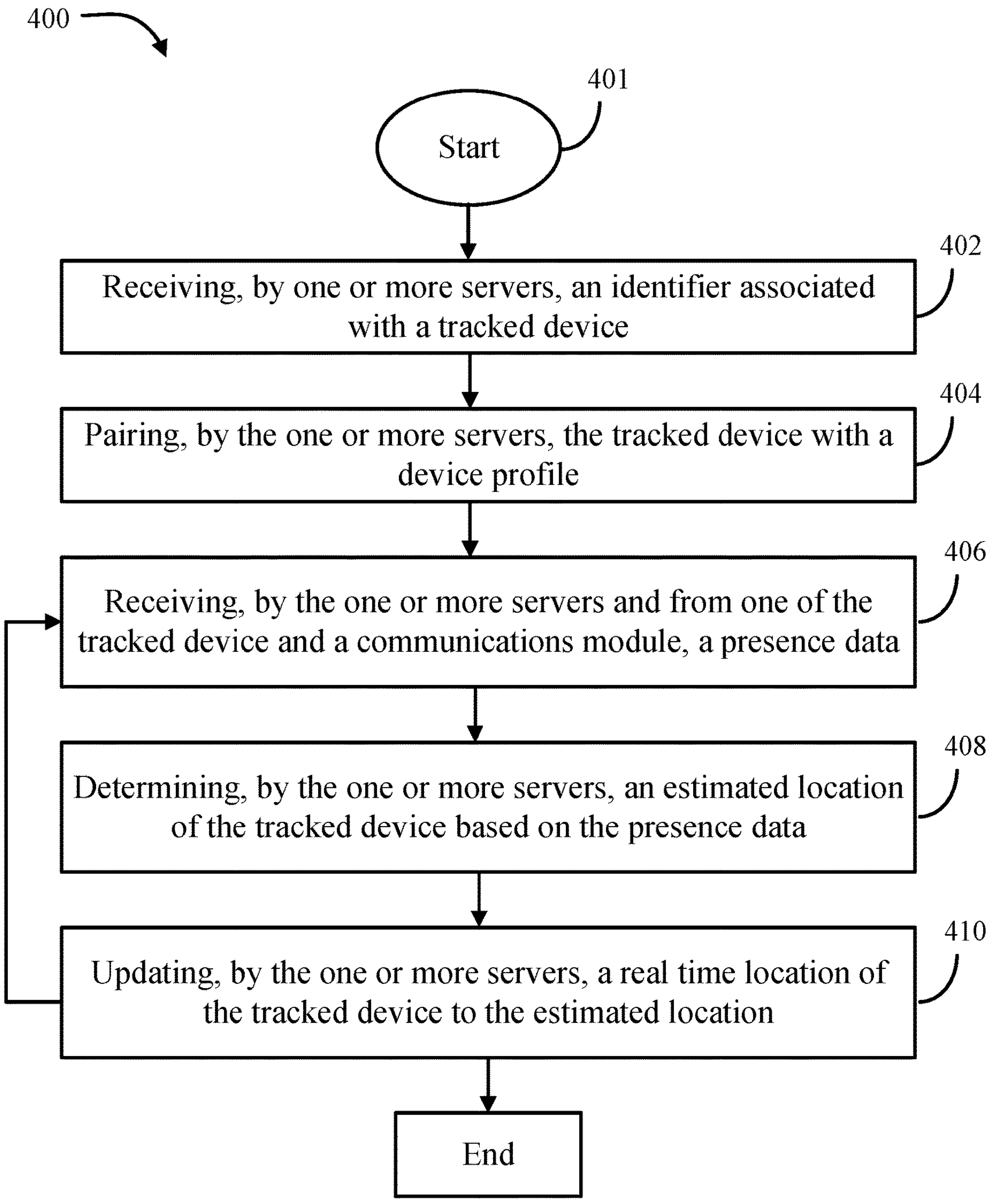
FIG. 4 illustrates a process performed by an indoor positioning system, in accordance with various embodiments.

With reference now to FIG. 4, a process 400 performed by the one or more servers 130 of the indoor positioning system 301, 302 is illustrated, in accordance with various embodiments. With combined reference now to FIGS. 3A, 3B, and 4, the process 400 starts in block 401 and comprises receiving, by the one or more servers, an identifier associated with a tracked device 150 (step 402) and pairing, by the one or more servers, the tracked device 150 with a profile (step 404). For example, an identifier can be generated by the one more servers 130 that is associated with a guest, an employee, or for an object at the hospital venue that is desired to be tracked (e.g., a hotel cart, a luggage cart, a bellman cart, a bar cart, a housekeeping cart, or the like) and paired with (i.e., associated with) a corresponding profile. Stated another way, the tracked device can then be identified by matching the identifier with a plurality of identifiers in the indoor positioning system and determining the profile that is associated with the identifier.

In various embodiments, the identifier can be generated in response to a guest registering with a mobile application, checking in at a front desk of the venue 10 from FIG. 1A, or the like), the present disclosure is not limited in this regard. In various embodiments, the identifier for the tracked device may already be generated and/or already have an associated profile. In this regard, the process 400 can further comprise accessing, by the one or more servers, a profile for the tracked device 150 (e.g., a reservation associated with a guest checking in), the profile associated with the identifier, prior to pairing the tracked device 150 with the profile.

In various embodiments, the process 400 further comprises receiving, by the one or more servers 130, from one of the tracked device 150 and a communications module 122, and in response to wireless communications between the tracked device 150 and the communications module 122, a presence data (step 406). In various embodiments, the presence data is associated with the identifier. In this regard, the one or more servers 130 can determine the profile associated with the identifier for the tracked device 150 as described previously herein. In various embodiments, the presence data includes a unique location identifier and a radio wave signal strength between the tracked device 150 and the communications module 122.

In various embodiments, the receiving the presence data in step 406 can further comprise receiving presence data associated with more than one communications module in the plurality of communication modules 120. For example, with brief reference to FIGS. 3A and 3B, in accordance with various embodiments, the tracked device 150 can form a wireless connection with more than one communication module (e.g., a first 311 of the communications module 122 and a second 313 of the communications module 122) simultaneously (or in short differences in time). Accordingly, the one or more servers 130 can receive presence data associated with both the first 311 of the communications module 122 and the second 313 of the communications module 122 simultaneously (or in short succession) (e.g., from each respective device for the indoor positioning system 301 from FIG. 3A or from the tracked device 150 in the indoor positioning system 301 from FIG. 3B).

In various embodiments, radio wave signal strength from a single communications module 122 in isolation can create false positive presence detection and localization. However, by spacing the plurality of communication modules 120 such that a user (e.g., a guest, an employee, an attendee, or the like) or an object is statistically detected along a path through the venue 10 from FIG. 1A across multiple communication modules in the plurality of communication modules 120, a significantly increased accuracy and precision for determining an estimated location of a user or object can be provided.

In various embodiments, with brief reference to FIG. 3A, the presence data is received from the tracked device 150 in response to the tracked device 150 detecting data packets (e.g., data packets 321 transmitted from the first 311 of the communications module 122 and/or data packets 323 from the second of the communications module 122). In various embodiments, with brief reference to FIG. 3B, the presence data is received from at least one communications module (e.g., from the first 311 of the communications module 122 and/or the second 313 of the communications module 122) in response to the communications module 122 receiving radio signals (e.g., radio signals 331 and/or radio signals 333) from the tracked device 150.

In various embodiments, the process 400 further comprises determining, by the one or more servers 130, an estimated location of a user (or object) based on the presence data (e.g., the unique location identifier, the radio signal strength, and the user (or object) identifier) (step 408). In various embodiments, the presence data can further include data associated with a change in the radio signal strength. In this regard, the one or more servers 130 can determine with the tracked device 150 is moving towards or away from the respective communications module 122 associated with the presence data. In various embodiments, by receiving presence data associated with the same tracked device 150 and more than one of the communications modules (e.g., the first 311 of the communications module 122 and the second 313 of the communications module 122 from FIGS. 3A and 3B), the one or more servers 130 can determine a more precise location of the tracked device. Stated another way, by having two physical reference points to analyze the presence data from a more precise estimated location may be determined. Accordingly, a greater the number of communications modules in the plurality of communication modules 120 from FIGS. 1A and 1B that are associated with presence data received by the one or more servers 130 from a tracked device 150 at, or near, the same time, the greater a precision and accuracy of an estimated location for the tracked device 150 can be, in accordance with various embodiments.

In various embodiments, the process 400 can further comprise determining a direction a user is walking based on the data received associated with at least two physical reference points from the presence data (e.g., by receiving multiple presence data with different signal strengths and time stamps in short succession or simultaneously) for a tracked device 150. In this regard, based on receiving multiple presence data sets associated with two or more communication modules in the plurality of communication modules 120, the one or more servers can determine a vector associated with a direction a user (or object) is traveling. Accordingly, the vector can be generated (or transmitted) through the GUI 142 as described herein to further provide precise and accurate location as well as a direction a user (or object) is travelling, in accordance with various embodiments.

In various embodiments, in the determining the estimated location of step 408, the process 400 can further comprise determining, by the one or more servers 130, the estimated location of the user is within a predetermined region (e.g., the spa 12, the restaurant 14, or the like) defined to generate an action. In various embodiments, the action can include a notification, a message, billing charge, or the like. The present disclosure is not limited in this regard. In various embodiments, responsive to determining the estimated location is within the predetermined region, the process 400 can automatically generating, by the one or more servers 130, the action.

In various embodiments, the predetermined region may be a region that a user is not supposed to enter (e.g., an employee only area). In this regard, the one or more servers 130 can generate the notification or the message to one of a trusted user device (e.g., an employee through the GUI 142 from FIG. 1B) or the user through a user device (e.g., the tracked device 150). Accordingly, both a user (or guest) and an employee can be automatically notified in response to a guest entering a region where the guest is not allowed (e.g., a kitchen 11 in a restaurant 14 of venue 10). In various embodiments, the predetermined region may be a pay only area (e.g., a spa, a restaurant, or the like). In this regard, in response to a tracked device 150 entering a pay only area where it is desired to charge a guest upon entering, the one or more servers can automatically generate a billing charge on a guest profile associated with the presence data, in accordance with various embodiments. In various embodiments, in response to a pay only to a tracked device 150 entering a pay only area, the one or more servers 130 can automatically generate a warning message to the tracked device 150 (e.g., through a user interface). In various embodiments, the warning message can include a data input (e.g., to accept or acknowledge a billing charge, to reject a billing charge, or the like). In various embodiments, in response to the tracked device 150 remaining in a pay only area for greater than a predetermined time period (e.g., 15 minutes, or 30 minutes, an hour, or the like), the one or more servers 130 can automatically generate a billing charge. In response to the predetermined region being an area where you pay later, such as a restaurant, a table can be tracked based on the presence data, and a billing charge can be generated in response to the account being closed out or the guest exiting the predetermined region entirely. Accordingly, more efficient billing can be achieved by the systems and methods disclosed herein, in accordance with various embodiments.

In various embodiments, the process 400 can further comprise updating, by the one or more servers 130, a real time location of a user associated with the tracked device to the estimated location (Step 410). In various embodiments, the updating in step 410 can be in response to changes in the first radio wave signal strength between the tracked device and the communications module 122. In various embodiments, the updating in step 410 can be in response to a second 313 of the communications module 122 forming a wireless connection with the tracked device 150 in addition to a wireless connection already formed between a first 311 of the communications module 122. Although described herein as updating from change in signal strength or forming another wireless connection, the present disclosure is not limited in this regard, and one skilled in the art can envision various different ways the real time location of the tracked device 150 associated with a user (or object) can be updated based on the process 400.

In various embodiments, after step 410, the process can repeat from step 406 in response to a new presence event (e.g., a change in signal strength, loss of detection by a communications module 122, addition of detection by a communications module, or the like). For example, the process 400 can further comprise receiving, by the one or more servers 130, from one of the tracked device 150 and a second 313 of the communications module 122, and in response to wireless communications between the tracked device 150 and the first 311 of the communications module 122 (e.g., via data packets 321, 323 as shown in FIG. 3A or via radio signals 331, 333 from FIG. 3B), a second unique location identifier (associated with a second physical reference point), a second radio wave signal strength between the tracked device 150 and the second 313 of the communications module 122, and the identifier. In various embodiments, in response to the receiving a second radio wave signal strength, a second unique location identifier and the identifier associated with the user (or object), the process 400 can further comprise determining a new estimated location of the tracked device 150 (step 408) and updating, by the one or more servers, the current location of the tracked to a second estimated location based on the second unique location identifier, the second radio wave signal strength, and the identifier (step 410). In various embodiments, the first unique location identifier corresponds to a first physical location within a venue 10 from FIG. 1A. Similarly, in various embodiments, the second unique location identifier corresponds to a second physical location within the venue 10 from FIG. 1A.

In various embodiments, the receiving the presence data in step 406 can further comprise receiving, by the one or more servers 130 and from one of the tracked device 150 and a connected network device (e.g., a router, a tablet, or the like), a location data. In this regard, the presence data can also be received by a connected network device that is not one of the communications module 122 in the plurality of communication modules 120, and the one or more servers 130 can update the current estimated location of the user based on the location data in step 410.

Figure 5:
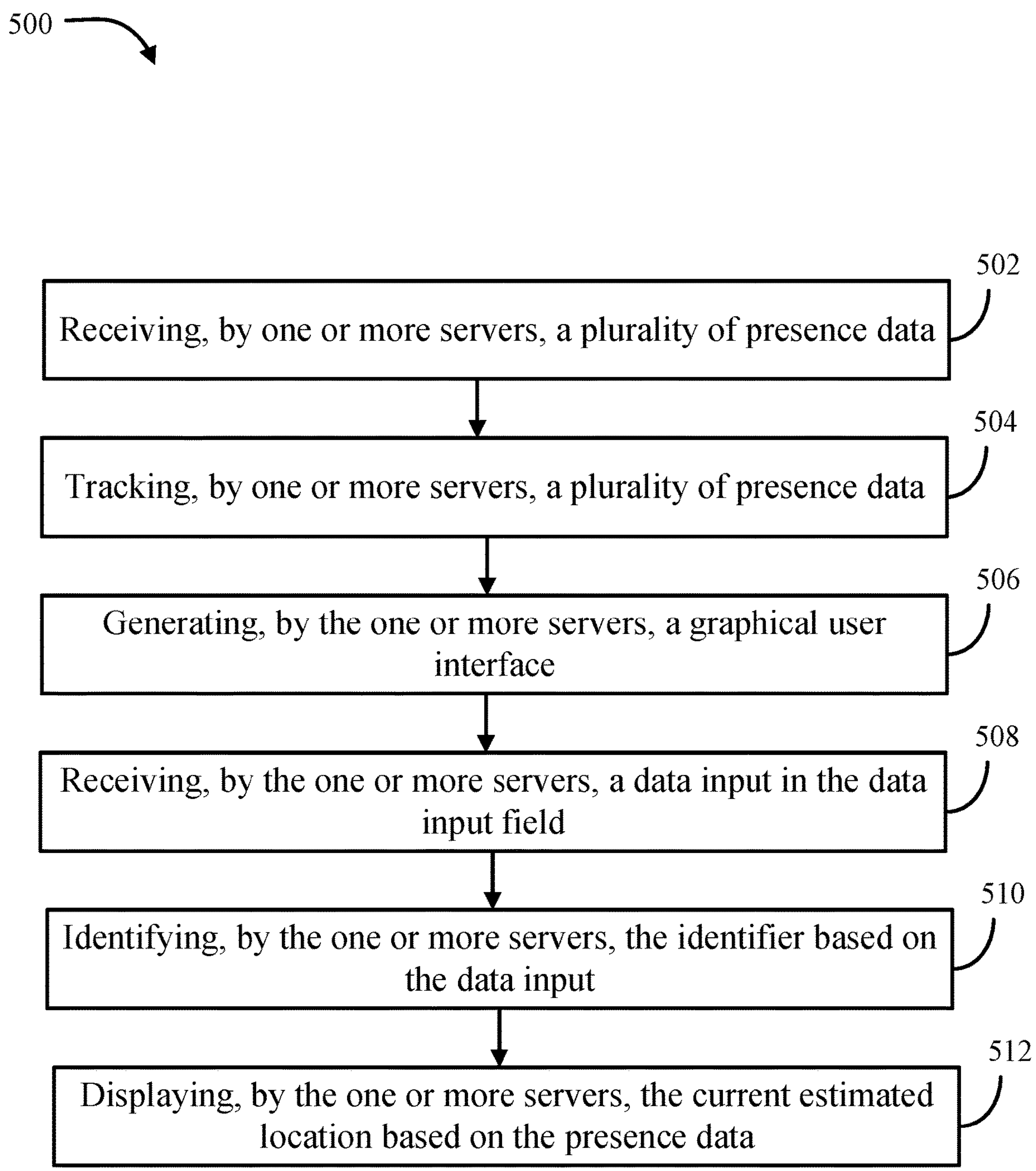
FIG. 5 illustrates a process performed by an indoor positioning system, in accordance with various embodiments.

Referring now to FIGS. 1B and 5, a process 500 performed by the one or more servers 130 of the system of FIG. 1B (e.g., the indoor positioning system 100, the hospitality management system 200, and/or the private branch exchange phone system 300) is illustrated, in accordance with various embodiments. In various embodiments, the process 500 comprises receiving, by the one or more servers 130, a plurality of presence data (e.g., as described in process 400 from FIG. 4), each presence data in the plurality of presence data associated with a respective profile in a plurality of profiles (e.g., guest profiles, employee profiles, and/or object profiles) (step 502); and tracking, by the one or more servers 130, the current estimated location of each user (or object) with the respective profile in the plurality of profiles based on the presence data (step 504).

In various embodiments, the process 500 further comprises generating, by the one or more servers 130 (and through a display device 140, such as a monitor, a phone, a tablet, or the like), a graphical user interface ("GUI") 142 (step 506). In various embodiments, the GUI 142 is a part of the hospitality management system 200. In this regard, locations of various guests, employees, and/or objects can be determined (e.g., as described above in connection with process 400 from FIG. 4) and displayed through the display device 140 via the GUI 142 to facilitate enhanced hospitality management, in accordance with various embodiments. In various embodiments, the graphical user interface includes a data input field. For example, the data input field can include a list of all registered tracked devices (e.g., associated with guest profiles, employee profiles, object profiles, or the like). In various embodiments, the data input field can be searchable. The present disclosure is not limited in this regard. In various embodiments, the graphical user interface can include a layout (or map) of the venue 10 from FIG. 1A. In various embodiments, the current estimated location of each profile in the hospitality management system 200 can be displayed on the map. In various embodiments, the data input field can include a selectable marker for each profile displayed on the map or layout. For example, in response to a user (e.g., an employee) selecting a selectable marker, information associated with the profile of the tracked device (e.g., guest information, employee information, object information, or the like) can be displayed on the display device 140, in accordance with various embodiments.

In various embodiments, the process 500 further comprises receiving, by the one or more servers 130, a data input in the data input field (step 508); identifying, by the one or more servers 130, the identifier based on the data input (step 510); and displaying, by the one or more servers and through the GUI 142, the current estimated location of a user based on one of a real-time presence data or a last received presence (e.g., from process 400 of FIG. 4) (step 512).

Figure 6:
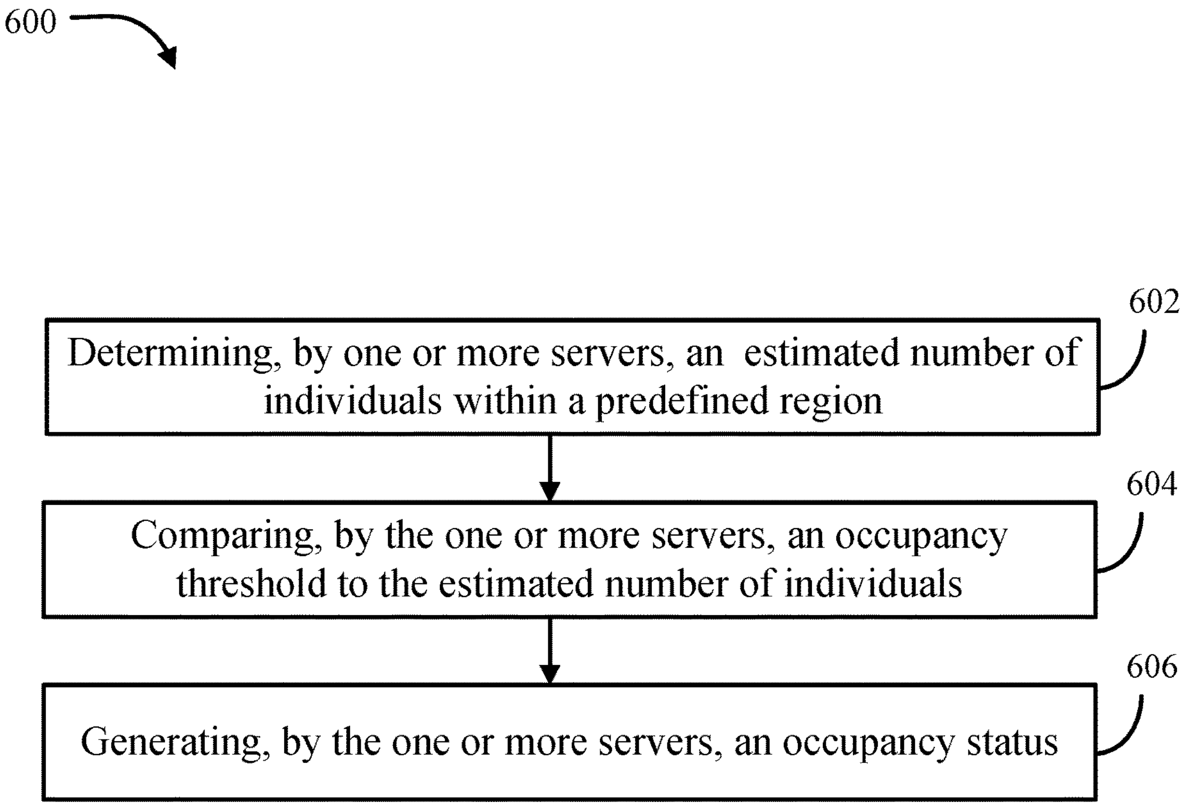
FIG. 6 illustrates a process performed by an indoor positioning system, in accordance with various embodiments.

Referring now to FIGS. 1B and 6, a process 600 capable of being performed by the one or more servers 130 of the system from FIG. 1B (e.g., an indoor positioning system 100, a hospitality management system 200, and/or a private branch exchange phone system 300) is illustrated, in accordance with various embodiments. The process 600 comprises determining, by the one or more servers 130 and based on the plurality of presence data (e.g., received from process 400 and/or process 500) corresponding to a predefined region (e.g., conference room 16 from FIG. 1A), an estimated number of individuals within the predefined region (step 602). In this regard, one or more communications modules in the plurality of communication modules 120 disposed proximate the predefined region can provide the presence data to the one or more servers 130 as described previously herein (e.g., via process 400 from FIG. 4 and/or process 500 from FIG. 5). Based on the presence data, the one or more servers 130 can count a number of tracked devices (e.g., in accordance with the tracked device 150) that are estimated as being within the predefined region.

In various embodiments, the process 600 further comprises comparing, by the one or more servers 130, an occupancy threshold of the predefined region to the estimated number of individuals (step 604); and generating, by the one or more servers and through a graphical user interface (e.g., GUI 142), an occupancy status of the predefined region based on the comparing (step 606). In various embodiments, the GUI 142 can be displayed through a display device 140. In various embodiments, the display device 140 can be disposed adjacent to the predefined region (e.g., immediately outside the conference room 16 from FIG. 1A), in accordance with various embodiments. Accordingly, the process 600 can provide guests of a venue 10 from FIG. 1A with real-time occupancy information, in accordance with various embodiments. In various embodiments, the process 600 can further comprise collecting, by the one or more servers 130, the estimated number of individuals in the predefined region and transmitting to one or more devices (e.g., tracked device 150), the occupancy status of the predefined region (e.g., based on the tracked device 150 being in a close proximity to the predefined region). In this regard, a tracked device that is close in proximity to a predefined region that exceeds the occupancy threshold, a user can be notified (e.g., through a user interface of the tracked device 150) that the occupancy threshold has been exceeded.

Figure 7:
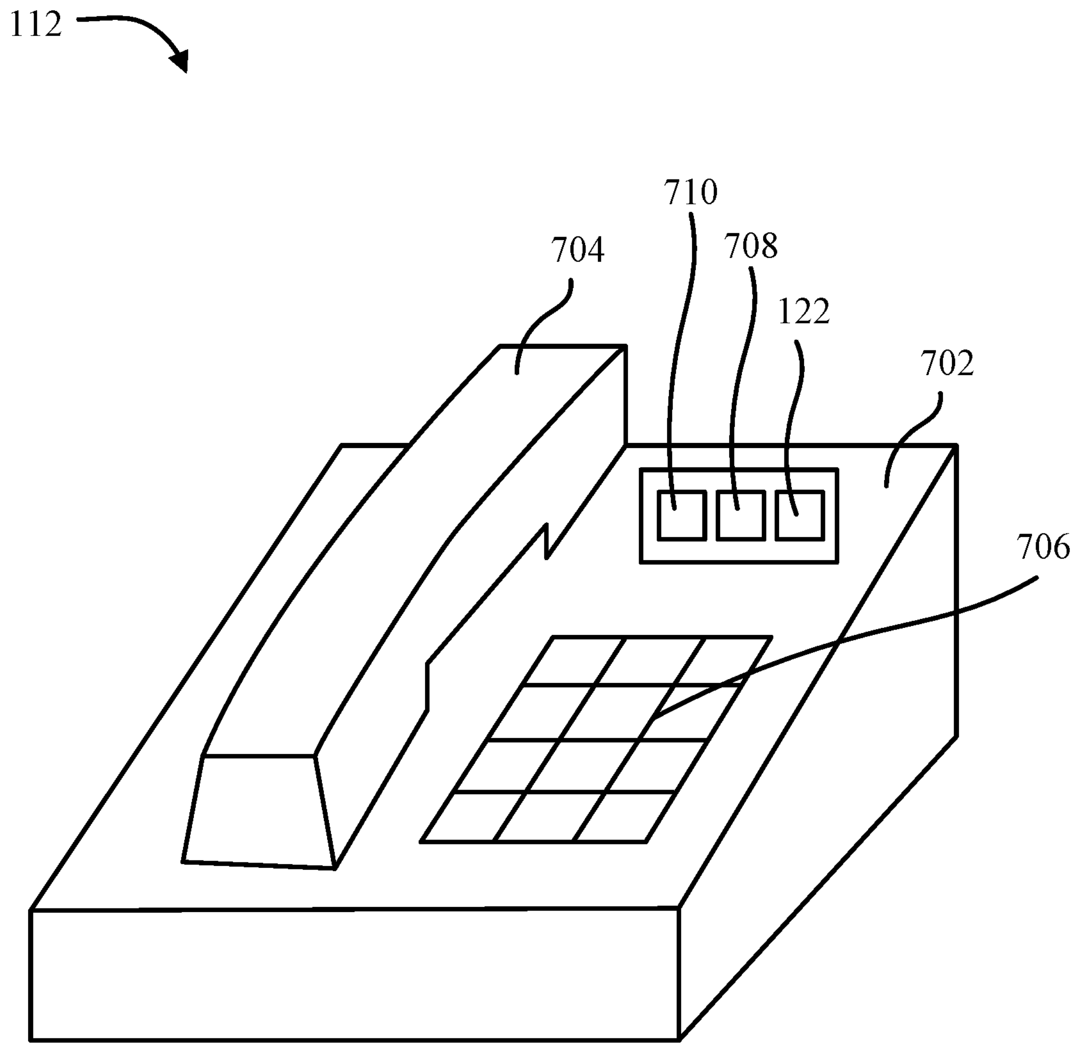
FIG. 7 illustrates a device for use in an indoor positioning system, in accordance with various embodiments.

Referring now to FIG. 7, a device 112 for use in a system from FIG. 1B (e.g., an indoor positioning system 100, a hospitality management system 200, and/or a private branch exchange phone system 300) is illustrated, in accordance with various embodiments. In various embodiments, the device 112 comprises a base 702 and a handset 704 operably coupled to the base 702. In various embodiments, the device 112 comprises the communications module 122. In various embodiments, the communications module 122 is coupled to, and or disposed within, the base 702. In various embodiments, the device 112 comprises a dial pad 706. Although illustrated as including a physical dial pad, the present disclosure is not limited in this regard. For example, the device 112 can comprise a digital dial pad and still be within the scope of this disclosure. In various embodiments, the device 112 is a phone. For example, the device 112 can comprise a phone for use in a private branch exchange phone system 300 as described previously herein. In this regard, the device 112 can be configured to be operably coupled to one or more servers 130 (e.g., wired or wirelessly). In various embodiments, the one or more servers 130 can be a central server disposed at the venue 10. However, the present disclosure is not limited in this regard. For example, the one or more servers 130 can be a part of a cloud-based system and still be within the scope of this disclosure. In various embodiments, the communications module 122 can be in accordance with the communications module 122 from FIG. 2A, FIG. 2B, or FIG. 2C. The present disclosure is not limited in this regard.

In various embodiments, the communications module 122 communications module is configured for use in a network of communication modules (e.g., the plurality of communication modules 120 from FIGS. 1A and 1B), the communications module 122 comprising a receiver (e.g., in accordance with FIG. 2B or 2C). In various embodiments, the device 112 further comprises a tangible, non-transitory computer-readable storage medium (e.g., memory 708) having instructions stored thereon that, in response to execution by a processor 710, cause the processor 710 to perform operations in accordance with the process 800 from FIG. 8 as described further herein.

Figure 8:
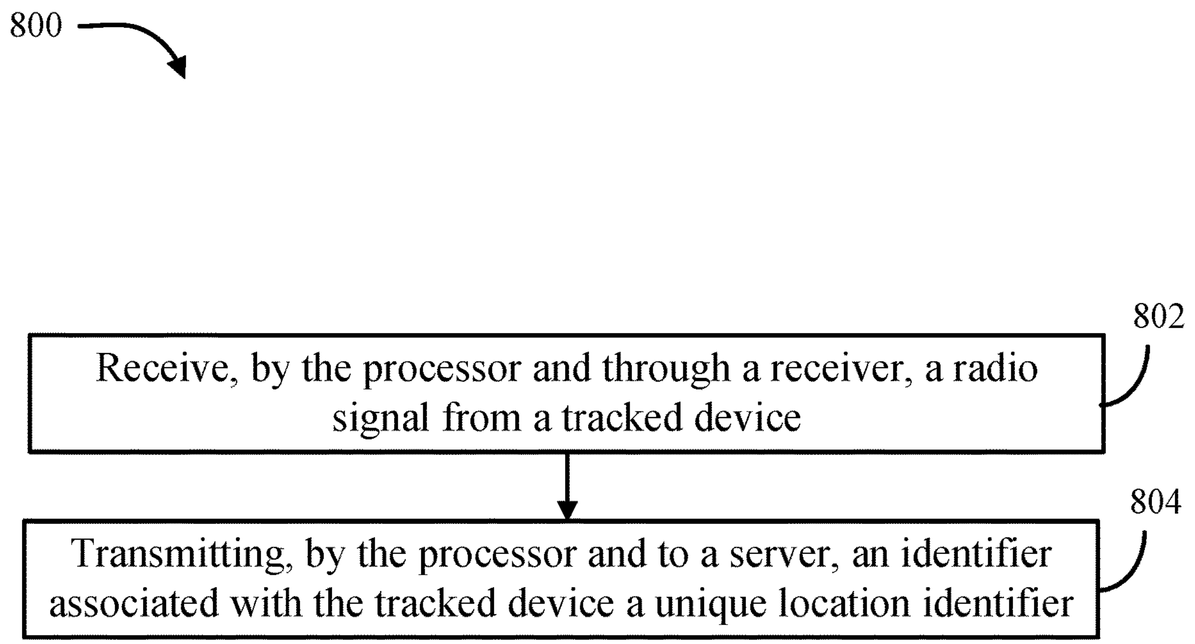
FIG. 8 illustrates a process capable of being performed by a device for use in an indoor positioning system.

Referring now to FIGS. 7 and 8, the process 800 (FIG. 8) capable of being performed by the processor 710 of the device 112 from FIG. 7 is illustrated, in accordance with various embodiments. In various embodiments, the process 800 is capable of being performed by the communications module 122 from FIG. 2B or FIG. 2C. In this regard, the process 800 is configured to be performed by the device 112 with a communications module 122 that includes a receiver 220 of FIG. 2B or a transceiver 230 of FIG. 230 (e.g., a receiver 220 or a transceiver 230 configured for near-field communications).

In various embodiments, with combined reference to FIGS. 1B, 7, and 8, the process 800 comprises receiving, by the processor 710 and through the receiver (e.g., receiver 220 or a receiver of transceiver 230), a radio signal from a tracked device 150 (step 802). In various embodiments, the receiving step can further comprise receiving, by the processor 710 and through the receiver (e.g., receiver 220 or a receiver of transceiver 230), a signal strength associated with the radio signal.

In various embodiments, the process 800 further comprises transmitting, by the processor 710 and to one or more servers 130, an identifier associated with the tracked device 150 and a unique location identifier associated with a physical reference point corresponding to the communications module 122, the physical reference point further corresponding to a predetermined physical location of the device 112 in at least a portion of a venue 10 from FIG. 1A (step 804). In various embodiments, the transmitting step 804 can further comprise transmitting, by the processor 710, the signal strength to the one or more servers 130.

As described previously herein, by implementing IoT capable systems within the hospitality industry (e.g., at a venue 10 from FIG. 1A), customers (e.g., guests), can be served better and an efficiency of operations at the venue 10 can be improved in accordance with various embodiments. In various embodiments, Information on presence of guests, employees, and/or objects via the systems and methods disclosed previously herein in an area of interest (e.g., spa 12, restaurant 14, conference room 16, reception area 18, bedroom 20, or the like at the venue 10 from FIG. 1A) can increase guest happiness, improve operational efficiency and/or improve guest safety.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," or the like, indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above-described concepts can be used alone or in combination with any or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible considering the above teaching.

What is claimed is:

1. A method, comprising:

receiving, by one or more servers, an identifier associated with a tracked device;

accessing, by the one or more servers, a profile for the tracked device, the profile associated with the identifier;

pairing, by the one or more servers, the tracked device with the profile;

receiving, by the one or more servers, from one of the tracked device and a first communications module, and in response to wireless communications between the tracked device and the first communications module, a presence data associated with the identifier, the presence data including a first unique location identifier and a first radio wave signal strength between the tracked device and the first communications module;

determining, by the one or more servers, a first estimated location of a user based on the first unique location identifier, the first radio wave signal strength, and the identifier; and updating, by the one or more servers, a current estimated location of the tracked device to the first estimated location, wherein the presence data further includes data associated with a change in the first radio wave signal strength, and wherein determining the first estimated location is further based on the change in the first radio wave signal strength.

2. The method of claim 1, further comprising:

receiving, by the one or more servers, from one of the tracked device and a second communications module, and in response to wireless communications between the tracked device and the first communications module, a second unique location identifier, a second radio wave signal strength between the tracked device and the second communications module, and the identifier; and updating, by the one or more servers, the current estimated location of the tracked device to a second estimated location based on the second unique location identifier, the second radio wave signal strength, and the identifier, wherein:

the first unique location identifier corresponds to a first physical location within a venue, and the second unique location identifier corresponds to a second physical location within the venue.

3. The method of claim 1, wherein the presence data is received from the tracked device in response to the tracked device detecting data packets transmitted from the first communications module.

4. The method of claim 1, wherein the presence data is received from the first communications module in response to the first communications module receiving radio signals from the tracked device.

5. The method of claim 1, further comprising:

receiving, by the one or more servers, a plurality of presence data, each presence data in the plurality of presence data associated with a respective profile in a plurality of profiles; and tracking, by the one or more servers, the current estimated location of each user with the respective profile in the plurality of profiles based on the presence data.

6. The method of claim 5, further comprising:

determining, by the one or more servers and based on the plurality of presence data corresponding to a predefined region, an estimated number of individuals within the predefined region;

comparing, by the one or more servers, an occupancy threshold of the predefined region to the estimated number of individuals; and generating, by the one or more servers and through a graphical user interface, an occupancy status of the predefined region based on the comparing.

7. The method of claim 1, further comprising:

determining, by the one or more servers, the current estimated location of the user is within a predetermined region defined to automatically generate an action, the action including one of a notification, a message, billing charge; and automatically generating, by the one or more servers, the action.

8. The method of claim 1, further comprising generating, by the one or more servers, a graphical user interface including a data input field;

receiving, by the one or more servers, a data input in the data input field, the data input associated with the profile;

identifying, by the one or more servers, the identifier based on the data input; and displaying, by the one or more servers and through the graphical user interface, the current estimated location of a user based on one of a real-time presence data or a last received presence data.

9. The method of claim 1, further comprising:

receiving, by the one or more servers and from one of the tracked device or a connected network device, a location data; and updating, by the one or more servers, the current estimated location of the user based on the location data.

10. An indoor positioning system, comprising:

a plurality of devices;

a plurality of communication modules configured to form a network of physical reference points in at least a portion of a venue, each communications module in the plurality of communication modules coupled to a respective device in the plurality of devices, each communications module in the plurality of communication modules including one of a receiver and a transmitter; and one or more servers in electronic communication with the plurality of devices, the one or more servers configured to track a location of a tracked device relative to the network of physical reference points based on data received in response to a wireless connection between the tracked device and at least one communication module in the plurality of communication modules, wherein the received data includes data associated with a change in a signal strength between the tracked device and the respective communication module.

11. The indoor positioning system of claim 10, further comprising a private branch exchange phone system, wherein:

each device in the plurality of devices is a phone in the private branch exchange phone system, and a server in the one or more servers is a private branch exchange server in the private branch exchange phone system.

12. The indoor positioning system of claim 10, wherein:

each communications module in the plurality of communication modules comprises the transmitter, and the transmitter is configured to periodically transmit data packets including a unique location identifier associated with a physical reference point in the network of physical reference points.

13. The indoor positioning system of claim 12, wherein the one or more servers is further configured to:

receive, from the tracked device, the unique location identifier and an identifier in response to the tracked device detecting the data packets; and determine a user location based on the unique location identifier and the identifier.

14. The indoor positioning system of claim 13, wherein the one or more servers is further configured to receive a signal strength between the tracked device and the respective communication module and determine the user location at least partially based on the signal strength.

15. The indoor positioning system of claim 10, wherein:

each communications module in the plurality of communications modules comprises the receiver;

the receiver is configured to receive a radio signal from the tracked device; and the one or more servers is further configured to receive, from the communications module, a unique location identifier associated with a physical reference point in the network of physical reference points and an identifier in response to the receiver receiving the radio signal from the tracked device.

16. A device, comprising:

a communications module configured for use in a network of communication modules, the communications module comprising a receiver; and a tangible, non-transitory computer-readable storage medium having instructions stored thereon that, in response to execution by a processor, cause the processor to perform operations comprising:

receiving, by the processor and through the receiver, a radio signal from a tracked device and a signal strength associated with the radio signal;

transmitting, by the processor and to one or more servers, an identifier associated with the tracked device and a unique location identifier associated with a physical reference point corresponding to the communications module, the physical reference point further corresponding to a predetermined physical location of the device in at least a portion of a venue; and transmitting, by the processor, the signal strength and data associated with a change in the signal strength to the one or more servers.

17. The device of claim 16, further comprising a base and a handset operably coupled to the base, wherein the communications module is coupled to the base.

18. The device of claim 16, wherein the receiver is configured for near-field communication.

19. An indoor positioning system including a plurality of the device of claim 16, wherein the plurality of the device form the network of communication modules.

* * * * *